Aug. 6, 1968     K. W. NORRIS     3,395,873
LOCKING MECHANISM
Filed Oct. 20, 1966
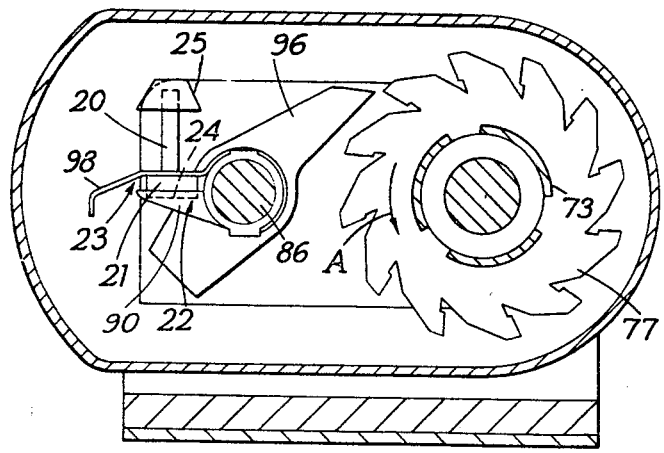
INVENTOR
KENNETH WILLIAM NORRIS
By Shoemaker and Mattare
Attys.

United States Patent Office 3,395,873
Patented Aug. 6, 1968

3,395,873
LOCKING MECHANISM
Kenneth William Norris, Burrell Road,
Haywards Heath, England
Filed Oct. 20, 1966, Ser. No. 588,178
Claims priority, application Great Britain, Oct. 20, 1965,
44,368/65
2 Claims. (Cl. 242—107.4)

ABSTRACT OF THE DISCLOSURE

A locking device for safety belts is made up of a frame with two spaced parallel shafts mounted therein. The shaft receiving the belt has ratchet teeth, and a pawl rotates on the other shaft. An inertia-sensitive device supported by the said other shaft operates the pawl means into engagement with the ratchet teeth. The inertia-sensitive device consists of a substantally vertical element having a free upper end and means integral with the lower end operatively contacting the pawl.

---

This invention relates to a locking mechanism.

There is disclosed in United States Patent No. 3,226,-053 an apparatus for dispensing and re-reeling a safety belt and also for locking said safety belt in response to the movement of an inertia-operated weight.

The principal object of the present invention is to provide a mechanism which is sensitive to deceleration, acceleration, violent cornering and any other sudden manoeuvre of an automotive vehicle and in which the losses due to friction are reduced and which (once it is actuated) achieves its function very rapidly and positively. It is a further object of the invention to provide an inertia-sensitive mechanism which will only react in response to an inertial force of a certain magnitude, this being an advantage in that it could be a nuisance to, say, the driver of the vehicle to be prevented by the safety belt from making any movement quite freely just because he is steering the vehicle around a corner which is only fairly sharp. Restraint by safety belt is only desirable when that a person or persons in the vehicle is or are in a potentially dangerous situation.

The present invention will now be more particularly described with reference to the accompanying diagrammatic drawing which is identical mutatis mutandis, with FIGURE 6 of said Patent No. 3,226,053 and in which some of the reference numerals employed are the same as those employed in said FIGURE 6. In the drawing there is illustrated an outer belt tube 73 which forms a part of the assembly by means of which a safety belt (not illustrated) is anchored to the apparatus. The tube 73 is drivingly connected at one end thereof to a toothed ratchet wheel 77 in the manner fully described in said patent and is connected at the other end thereof to a powerful coil spring which is also not illustrated but which, again, is fully described in said patent. The arrangement is such that the belt may be freely drawn off to enable a prospective wearer to fasten the belt around him or to permit the wearer to reach across the vehicle or to bend forwards deliberately in order to pick something up off the vehicle floor, the belt becoming re-reeled under the influence of the spring in order to take up any slack in the belt when the belt is, say, either taken off or the wearer leans or sits back in the seat after having been leaning forwards.

The ratchet wheel 77 is rotated about its axis in the direction indicated by the arrow A and is adapted to be engaged by a pawl 96 when an inertia-sensitive device consisting of a vertical element 20 and a base 21 tips up or topples about the point indicated by the numeral 22, such movement being possible by virtue of the fact that the element 20 extends through a hole formed in a one-piece tappet 98 which is connected to the pawl 96. The hole through which the element 20 extends has not been illustrated because it is considered that the drawing would become more difficult to read if it had been, without any real clarification having been achieved by its illustration. It will, however, be appreciated that the diameter of said hole in the tappet 98 will be greater than that of the element 20 in order to accommodate the movements of said element when it tips up or topples in any direction.

When the vehicle is for example braked hard, the element 20 and integral base 21 will tip up or topple about the point 22 and therefore the tappet 99 and the pawl 96 will be rotated in a clockwise direction about the axis of a shaft 86 in order to cause engagement of said pawl 96 and a tooth of the ratchet wheel 77.

There is comparatively little friction between the point of the base 21 which is indicated by the numeral 22 and the underside of the tappet 98 because the movement of said point 22 as the element 20 and the base 21 tips up or topples is substantially vertical.

It will be apparent that, as soon as the force which is acting on the element 20 and its integral base is increased (for example by hard braking, violent swerving and the like), the inertia-sensitive device is actuated, and the increase of force which is required to move said inertia-sensitive device through one degree from its stable state (which is as illustrated, namely, with the element 20 vertical) may decrease as the angle through which said device has been moved increases, although said force may not in fact decrease. However, once the force acting on said element 20 has initiated tipping up or toppling of the inertia-sensitive device, the increase of force requisite to do so may decrease without adversely affecting the function of said device. When the said increase of force becomes zero the device returns to its stable state and the pawl 96 disengages the relevant tooth of the ratchet wheel 77.

It is considered to be desirable to seat the base 21 in a shallow depression 24 which will effectively prevent any tendency of said base to slide on the upper surface of the arm 90 which is carried by the support 89 which is fixed to the shaft 86 in the manner fully described in Patent 3,226,053. Instead of a depression 24, a continuous ridge (not illustrated) which is circular in plan configuration, may be provided and which will serve the same purpose.

It may also be desirable to provide the upper end of the element 20 with an enlargement 25 which could either be integral with or be separate from said element. If separate, the enlargement 25 could constitute a means for adjusting in a simple manner the sensitivity of the inertia-sensitive device, a range of enlargements 25 of graded sizes being available.

Other parts of the apparatus which are not affected by the replacement of the pendulum or bobweight of Patent No. 3,226,053 by the inertia-sensitive device just described herein will be identical with those described and illustrated in said patent.

What I claim as my invention and desire to secure by Letters Patent of the United States is:

1. An apparatus for dispensing and locking a safety belt, comprising a frame, first and second spaced parallel shafts mounted in said frame, a rotatable drum mounted on said first shaft upon which said safety belt is adapted to be mounted, a plurality of ratchet teeth mounted on said drum, pawl means pivotally mounted on the second shaft operable to engage said teeth but normally disengaged therefrom, an inertia-sensitive device supported by said second shaft for angular movement from a stable state to operatively pivot the pawl means into engagement with the ratchet teeth, said inertia-sensitive device consists of a substantially vertical element having a free upper end and at the other end thereof a base operatively contacting the pawl, the center of gravity of the whole device being at the greatest feasible distance above the base, said device being such that the increase of force required to move said device through one degree from its stable state decreases as the angle through which said device has been moved increases.

2. An apparatus as claimed in claim 1, wherein removable means are located upon said free end, the size and weight of said removable means being selected to impart to the apparatus the exact degree of sensitivity to inertia which is required.

References Cited
UNITED STATES PATENTS

| | | | |
|---|---|---|---|
| 2,557,313 | 6/1951 | Quilter | 242—107.4 X |
| 2,650,655 | 9/1953 | Neahr et al. | 242—107.4 X |
| 2,708,555 | 5/1955 | Heinemann et al. | 242—107.4 |
| 3,323,749 | 6/1967 | Karlsson | 242—107.4 |

WILLIAM S. BURDEN, *Primary Examiner.*